United States Patent [19]

Shaver

[11] 4,180,081
[45] Dec. 25, 1979

[54] DISTRIBUTION AUGERS FOR AN AXIAL FLOW COMBINE

[75] Inventor: J. Lyle Shaver, Blue Springs, Mo.
[73] Assignee: Allis-Chalmers Corporation, Milwaukee, Wis.
[21] Appl. No.: 947,471
[22] Filed: Oct. 2, 1978

Related U.S. Application Data

[63] Continuation of Ser. No. 809,408, Jun. 23, 1977, abandoned.

[51] Int. Cl.² ............................................. A01F 12/18
[52] U.S. Cl. .............................. 130/27 R; 130/27 HA; 130/27 Q
[58] Field of Search ............. 130/27 R, 27 H, 27 HA, 130/27 P, 27 Q; 56/14.6

[56] References Cited

U.S. PATENT DOCUMENTS

| | | | |
|---|---|---|---|
| 3,527,233 | 9/1970 | Mathews | 130/27 R |
| 3,946,746 | 3/1976 | Decoene | 130/27 Q |

Primary Examiner—Jay N. Eskovitz
Attorney, Agent, or Firm—Charles L. Schwab

[57] ABSTRACT

The threshing cylinder and the surrounding screened cage of an axial flow combine are transversely mounted on the combine and are of a greater axial length than the width of the cleaning section. Threshed material passing through the openings in the cage screen is distributed to a feeding slot above the cleaning section by distribution augers. An overfeed auger is positioned over the inlet to the cage so as to convey threshed material passing through the cylinder cage in the area above the feeder mechanism to a point alongside the feeder mechanism where it is discharged onto a wall sloping to a distribution auger. A pair of distribution augers serve to move threshed material from the bottom of the cage housing which extends laterally beyond the cleaning section laterally inwardly to the feeding slot. The distribution augers have spiraled flights and paddles so pitched and positioned as to obtain a relatively even transverse distribution of the threshed material to the accelerator rolls and thence to the cleaning shoe assembly disposed below the screened cage and threshing cylinder.

10 Claims, 10 Drawing Figures

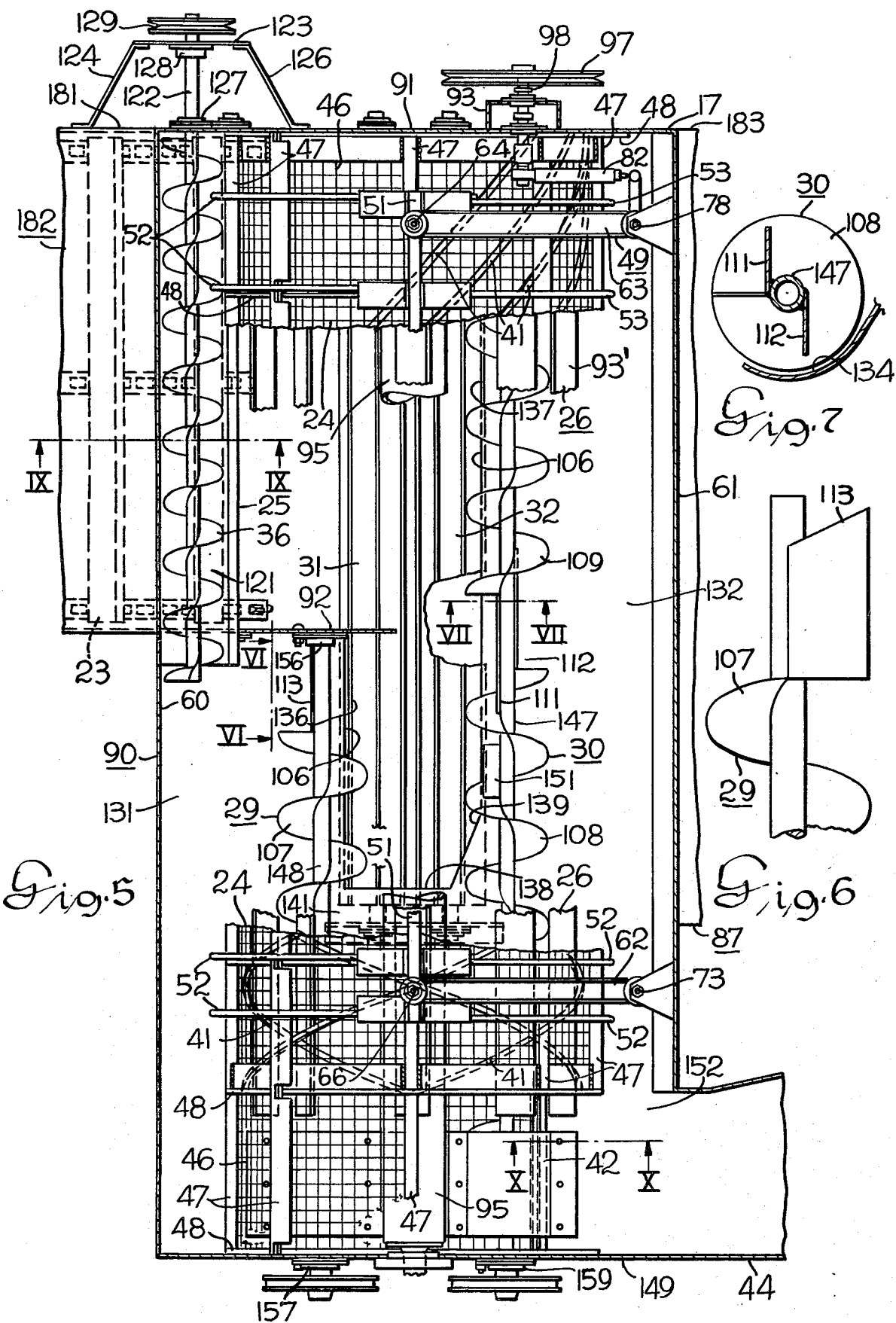

DISTRIBUTION AUGERS FOR AN AXIAL FLOW COMBINE

This a continuation, of application Ser. No. 809,408, filed June 23, 1977 and now abandoned.

BACKGROUND OF THE INVENTION

The overfeed and distribution augers of this invention have application to an axial flow combine wherein the axis of the threshing cylinder and coaxial surrounding cage is transverse to the direction of travel of the combine and wherein the cleaning shoe is of a lesser width than the axial length of the axial flow threshing cylinder and coextensive cage.

Axial flow combines to which this invention has particular application are shown in my U.S. Pat. No. 4,007,744, Grain Accelerator Precleaner, issued Feb. 15, 1977, and in my copending U.S. patent application, Ser. No. 780,532, filed Mar. 23, 1977, for Agitator for an Axial Flow Cylinder.

SUMMARY OF THE INVENTION

A conveyor mechanism is employed to move threshed material passing radially through the peripheral openings of the cage surrounding an axial flow threshing cylinder of a combine to a feeding slot disposed above the cleaning section of the combine where separation of grain and chaff occurs. The last-mentioned section is of less transverse width than the axial length of the axial flow threshing cylinder, the latter being in transverse relation to the direction of travel of the combine. The conveyor mechanism is disposed in the lower part of a housing for the cylinder and cage and functions to move threshed material from the bottom of that part of the housing which extends transversely beyond the cleaning section inwardly to the feeding slot for the cleaning section.

The conveyor mechanism may take the form of one or more distribution augers disposed parallel to the axis of the threshing cylinder.

An overfeed auger may be mounted above the feeder mechanism, by which cut crop is fed to the threshing cylinder, to convey threshed material passing through the periphery of the cylinder cage in the area thereof above the upper end of the feeder mechanism to a discharge zone adjacent one lateral side of the feeder mechanism where the material falls downwardly to the feeding slot.

The overfeed auger above the feeder mechanism may be cantilevered and the threshed material discharged by such auger may fall down a sloping wall of the housing. The conveyor mechanism beneath the cage may be used to assist movement of the threshed material discharged by the overhead distribution auger to the feeding slot.

BRIEF DESCRIPTION OF THE DRAWINGS

FIG. 5 is a section view taken along the line V—V of FIg. 1 with parts broken away for illustration purposes;

FIG. 6 is a section view taken along the line VI—VI in FIG. 5;

FIG. 7 is a section view taken along the line VII—VII in FIG. 5;

FIG. 8 is a section view taken along the line VIII—VIII in FIG. 2;

FIG. 9 is a section view taken along the line IX—IX in FIG. 5; and

DETAILED DESCRIPTION OF THE DRAWINGS

Figure 1:
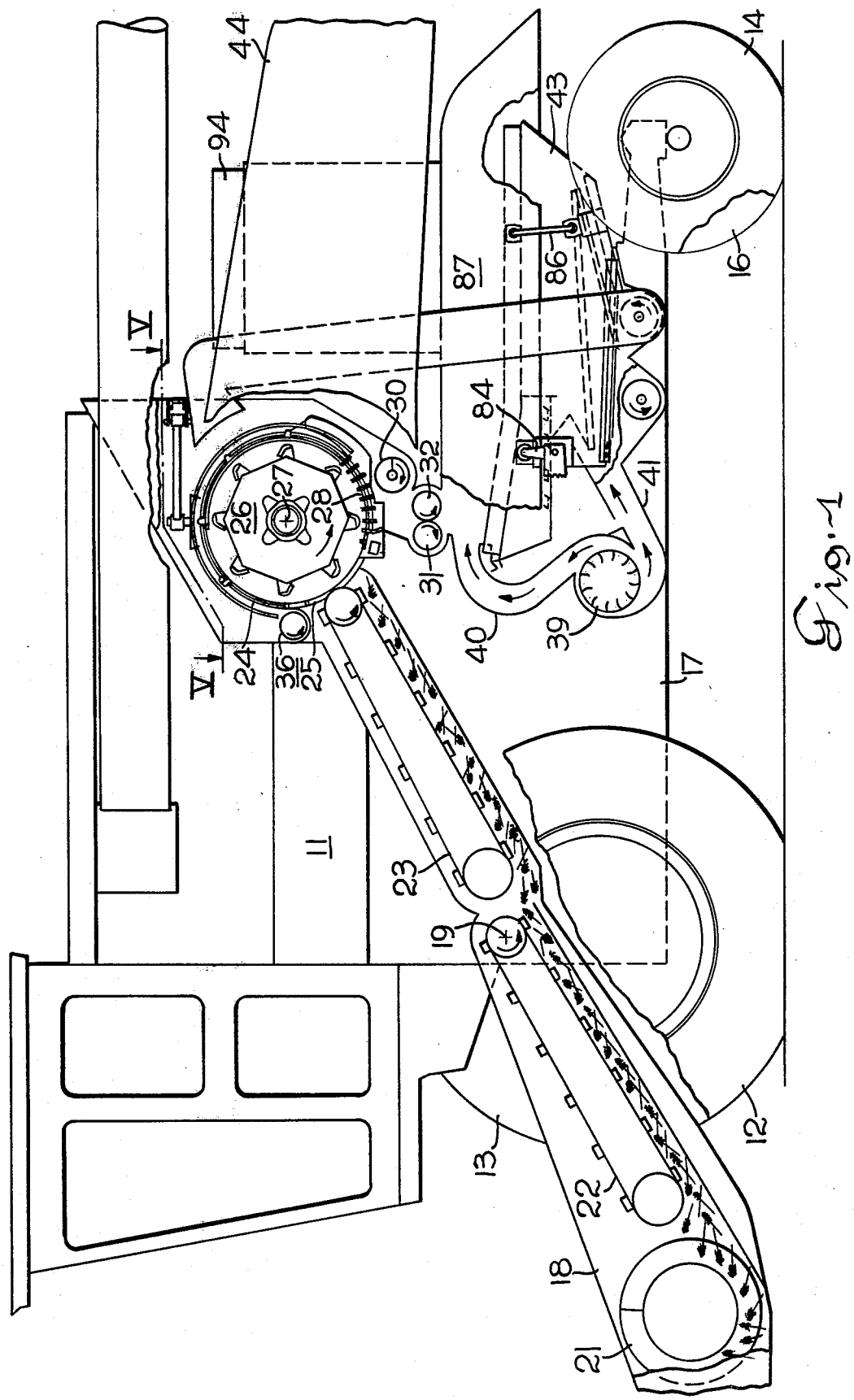
FIG. 1 is a side view of a combine with parts shown schematically and with parts broken away for illustration purposes.
Figure 2:
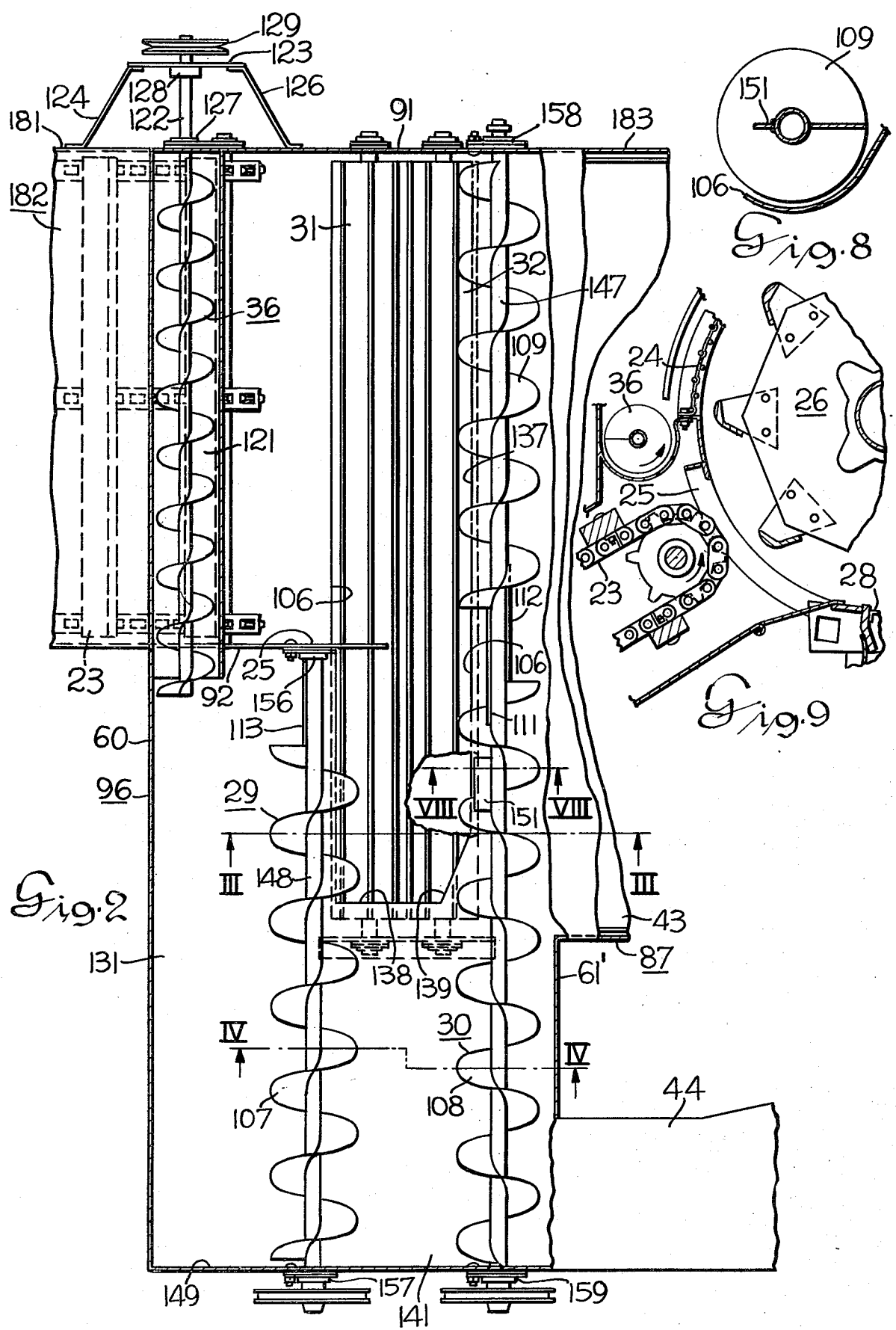
FIG. 2 is a view looking downwardly at the distribution augers of the present invention.
Figures 4, 10:
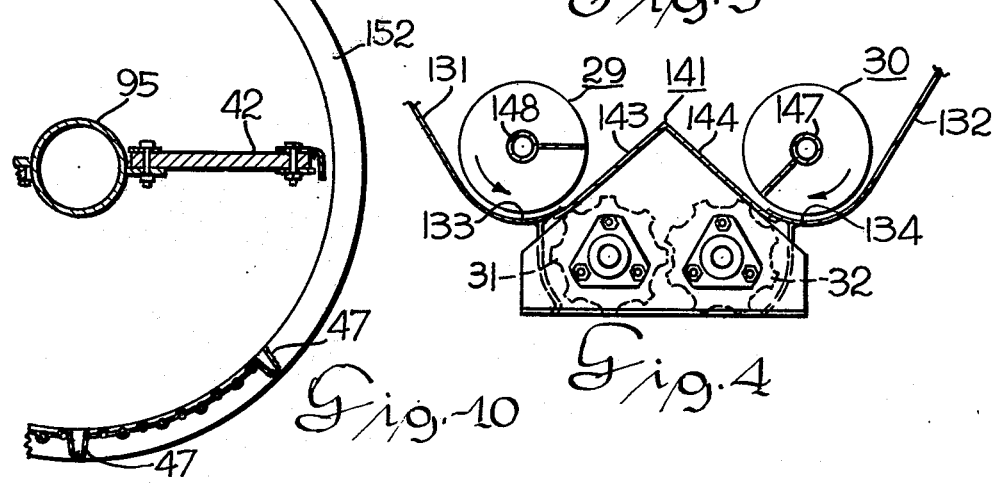
FIG. 4 is a section view taken along the line IV—IV in FIG. 2.
FIG. 10 is a section view taken along the line X—X in FIG. 5.

Referring to FIG. 1, the combine 11 in which the present invention is illustrated includes a pair of front drive wheels 12, 13 and a pair of steerable rear wheels 14, 16 supporting a main frame 17. A header 18 is pivotably connected to the main frame on a transverse axis 19 for vertical adjustment of the cutting height. An auger 21 with oppositely pitched helical flights moves the cut crop inwardly from the transversely outward extending ends of the header to a centrally located feeder mechanism. The feeder mechanism includes a first slat feeder 22 which moves the cut crop upwardly and rearwardly from the auger 21 and a second slat feeder 23 which in turn moves the cut crop to an axial flow threshing cylinder 26. The threshing cylinder 26 is mounted on the main frame 17 for rotation about a transverse axis 27 within a cylindrical, stationary screened cage 24. An opening or inlet 25 (see FIG. 9) in the ring front of the cage 24 permits cut crop to pass from the feeder mechanism into the cage 24. A concave 28 is incorporated in the bottom right part of the screened cage 24 and is disposed below the cylinder 26. Threshed material passing downwardly through the concave and radially through the screen of the cage 24 is moved by augers 29, 30, 36, as shown in FIG. 2, to a transversely elongated slot 106 in the housing 96 which feeds a pair of counterrotating accelerator rolls 31, 32. Threshed material will consist mainly of grain, chaff and small pieces of stalk. The stalk material which stays within the cage is moved axially by helical ribs on the inside of the cage to a discharge opening 152 (see FIGS. 5 and 10) at the left rear of the cage 24 where a beater 42 on the cylinder 26, as shown in FIGS. 5 and 10, induces movement rearwardly through a straw discharge chute 44.

Referring also to FIGs. 2 through 7, a pair of accelerator rolls 31, 32 increases the downward velocity of the threshed material passing downwardly through the transverse feeding slot 106. As shown in FIG. 1, a fan 39 directs air through upper and lower discharge ducts 40, 41 to the upper and lower regions of the shaker shoe assembly 43 mounted for longitudinal reciprocating movement on suitable rockers 84, 86. The transverse flow cleaning fan 39 and the ducts 40, 41 are of substantially the same transverse width as the width of the cleaning section 87 of the combine. The function of the accelerator rolls 31, 32, the cleaning fan 39 and the cleaning shoe assembly 43 is described in greater detail in my U.S. Pat. No. 4,007,744.

As shown in FIGS. 2 and 5, the upper slat feeder 23 feeds the cut crop to the threshing cylinder 26 by way of the opening 25 in the cage 24 between walls 91, 92 of the combine frame 17. The threshing cylinder 26, which includes a plurality of axially extending rasp bars 93' and a discharge paddle 42, is driven by the engine 94 (shown in FIG. 1) through a power train, not shown. As the threshing cylinder 26 is rotated, the cut crop is threshed—causing the grain or seed to be separated from the heads, ears or pods of the crop. The grain or seed and small particles pass through the openings in the cylindrical screen 46 secured to longitudinal members 47 of the cage 24. The longitudinal members 47 are secured to annular frame components 48 which are positioned along the cage 24 at appropriate axially spaced intervals. The stationary helical bars 41 fixed to the inside of the cage 24 cause the material remaining in the cage, which is mainly straw or stalk, to move axially. The straw or stalk material moves axially due to the interaction of the threshing cylinder 26 and the spiral bars 41 on the inside of the cage 24 until it reaches the axial end of the cage shown at the bottom of FIG. 5, where the paddle 42 fixed to the shaft 95 of the cylinder 26 discharges the straw rearwardly through the discharge opening 152 and into the discharge chute 44.

An agitator 49 is provided to cause the threshed material passing through the screen 46 in the upper part of the cage 24 to fall downwardly between the cage 24 and the front and rear walls 60, 61 of the housing 96 to the slot 106 in the bottom of the housing 96 for the cylindrical cage 24. The agitator mechanism is the subject of my beforementioned copending United States patent application, Ser. No. 780,532.

As illustrated in FIG. 5, the agitator mechanism 49 includes a backbone member 51 to which arcuate fingers 52, 53 are secured and also includes a pair of mounting arms 62, 63 pivotally mounted on the rear wall 61 by pivot members 64, 66, 73, 78. The agitator mechanism is reciprocated axially through a link 82 connected at one end to a finger projecting from arm 63. The other end of link 82 is eccentrically connected to a shaft 98 rotatably mounted by suitable bearings in wall 91 and a wall extension 93. The outer end of the shaft 98 has a pulley 97 secured thereto which is driven by an appropriate belt (not shown) connected to a drive train (not shown) driven by the engine 94.

Threshed material passing through the screen 46 of the cage 24 in the area above the inlet 25 to the cage, through which the slat feeder 23 feeds the cut crop to the threshing cylinder, will be agitated by the fingers 52 of the agitator mechanism 49 and caused to fall down into a trough 121 extending transversely above the upper end of the slat feeder 23. The trough 121 is semicylindrical in shape so as to cooperate with the spiral flighted overfeed auger 36 disposed therein. The overfeed auger 36 includes a shaft 122 which extends in cantilever fashion from the wall 91. A laterally outer auxiliary wall 123 is secured to wall 91 through brackets 124, 126 and the shaft 122 is supported in the walls 91, 123 by appropriate bearings 127 and 128. A V-belt pulley 129 is secured to the outer end of shaft 122 and is connected by an appropriate V-belt with the drive train of the engine. By supporting the overfeed 36 on only one end, the use of a bearing and associated mounting bracket at the other end is avoided. This helps to keep the interior of the housing 96 for the cage 24 free of obstructions to the threshed material passing through the upper part of the cage screen 46 and falling down between the cage 24 and the front wall 60 of the housing 96.

The front and rear walls 60, 61 of the housing 96 for the cylinder 26 and cage 24 have downwardly converging portions 131, 132 which slope at a sufficiently steep angle to cause the threshed material falling thereon to slide downwardly to parallel, semicylindrical troughs 133, 134 disposed beneath and in cooperative coaxial relation to the conveying mechanism in the form of distribution augers 29, 30. The longitudinally confronting transverse edges 136, 137 together with end edges 138, 139 on the bottom wall 141 of housing 96 define the feeding slot 106 for the accelerator rolls 31, 32. As shown in FIG. 4, the bottom wall disposed adjacent to the left transverse end of the slot 106 and in general transverse alignment therewith includes upwardly converging sloping wall segments 143, 144 which are pitched at a steep enough angle to cause any threshed material deposited thereon to slide downwardly to the auger troughs 133, 134.

The conveying mechanism (augers 29, 30) serve to move threshed material from the bottom of the housing 96 which extends laterally outward from (to the left of) the cleaning section 87 in which the cleaning shoe assembly 43 is disposed. The distribution augers 29, 30 also assist in evenly distributing the threshed material passing through the cage screen 46 to the accelerator rolls 31, 32 deposed below the feeding slot 106. A major portion of the threshed material passes radially through the cage screen 46 and concave 28 at the right end thereof (the upper portion of FIG. 5). The initial threshing action of the rasp bars 93 of the cylinder 26 on the cut crop feed thereto by the slat feeder 23 causes dislodgement of most of the kernels from the head, ear or pod of the stalk. In order to distribute some of the threshed material to the part of the feeding slot to the left of the feeder 23 and inlet 25, a spiral flight 109 is secured as by welding to the shaft 147 of rotating auger 30. The flight 109 is pitched so as to cause threshed material to move to the left in the trough (as viewed in FIG. 2) when rotated clockwise as viewed from the left end of the auger 30 (as viewed in FIGS. 3 and 4). Some material will be urged over the edge 137 as the auger 30 rotates and some will move axially toward the left side of the combine until it arrives at the paddle structure comprising paddles 111, 112 secured by welding to the shaft 147. The paddles 111, 112 extend in axial alignment with and extend approximately radially from the shaft 147 so as to act as beaters to discharge threshed material from the trough 134 into the accelerator rolls feeding slot 106.

The axial length of the transversely disposed threshing cylinder 26 and screened cage 24 is over twice the width of the feeder 23 and approximately 1.4 times the transverse width of the cleaning shoe assembly 43. The accelerator rolls 31, 32 are approximately as long as the cleaning shoe assembly 43 is wide. Spiral flights 107, 108 are secured, respectively, by welding to the shaft 148 of auger 29 and to the shaft 147 of auger 30. The flights 107 and 108 are pitched to move threshed material away from the left wall 149 of the cage and cylinder housing 96 toward the central part of the combine when the augers are rotated in the direction indicated by arrows in FIGS. 3 and 4. Threshed material passing through the periphery of the left half of the cage screen 46 falls onto the sloping side walls 131, 132 and sloping bottom walls 143, 144 and slides to the auger troughs 133, 134. The spiral flights 107, 108 of the rotating augers 29, 30 cause the threshed material to be moved inboard toward the slot 106. As the threshed material is moved toward the central part of the combine by auger 30, some is discharged over the rear edge 137 of the slot 106 to the accelerator rolls. When the threshed material moved by flight 108 of auger 30 reaches a small paddle 151, the latter will discharge a substantial part of the augered material into the slot 106. The threshed material moved by the auger flight 108 which reaches the paddles 111, 112 will be discharged by the latter into the slot 106. The spiral flight 107 on counterrotating auger 29 moves threshed material falling into the associated trough 133 toward the central part of the combine. Some of the threshed material is discharged over the edge 136 before it reaches the axially and radially extending paddle 113 welded to the inboard end of the shaft 148 of the auger 29. The threshed material moved to the inboard end of the flight 107 of auger 29 and the threshed material discharged by the overfeed auger 36 is discharged by the paddle 113 into the slot 106 above the accelerator rolls 31, 32. The left end of the feeder slot 106 is of gradually reducing width as determined by sloping edge 139 thus slightly reducing the discharge by the auger flight 108 over the edge 139 of the slot 106 as compared with what would be discharged into the slot 106 if the edge 137 continued straight to the left end of the slot.

The configuration of the slot 106, the flighting of the augers and the paddle structures 111, 112, 113, 151 on the augers all contribute to evenly distribute the threshed material passing through the screen 46 of the cage 24 to the accelerator rolls 31, 32. Thus the accelerator rolls 31, 32 accelerate a relatively uniform layer of threshed material downwardly into the layer of cleaning air directed rearwardly by upper duct 40. The even distribution of the threshed material to the accelerator rolls permits maximum utilization of the capacity of the cleaning shoe assembly. The cage 24 has radial discharge openings in its screen 46 and concave 28 throughout the cylindrical periphery thereof thereby maximizing the threshing capacity of the combine. The only cage areas not covered or defined by the screen 46 or the concave 28 are the inlet 25 and the discharge opening 152. As beforementioned, the agitator mechanism 49 prevents threshed material passing through the screen 46 from building up on the top outer surface of the screen 46 and the cantilevered overfeed auger 36 conveys threshed material deposited in the trough 121 to the inboard end of the latter where it is discharged to the downwardly and rearwardly sloping wall 131.

As shown in FIG. 2, the inboard end of the shaft 148 of the auger 29 is rotatably supported on the inner vertical wall 92 of the combine by a suitable bearing 156 and the outboard end of the shaft 148 is rotatably supported in the left side wall 149 of the cage housing by a suitable bearing 157. The shaft 147 of auger 30 is supported in the vertical right and left side walls 91, 149 by bearings 158, 159, respectively, so as to position the augers 29, 30 in horizontally spaced, parallel relation to one another on opposite fore and aft sides of the transversely extending feeding slot 106. The augers 36, 29, 30 are parallel to one another and to the cylinder 26, cage 24 and accelerator rolls 31, 32.

Figure 3:
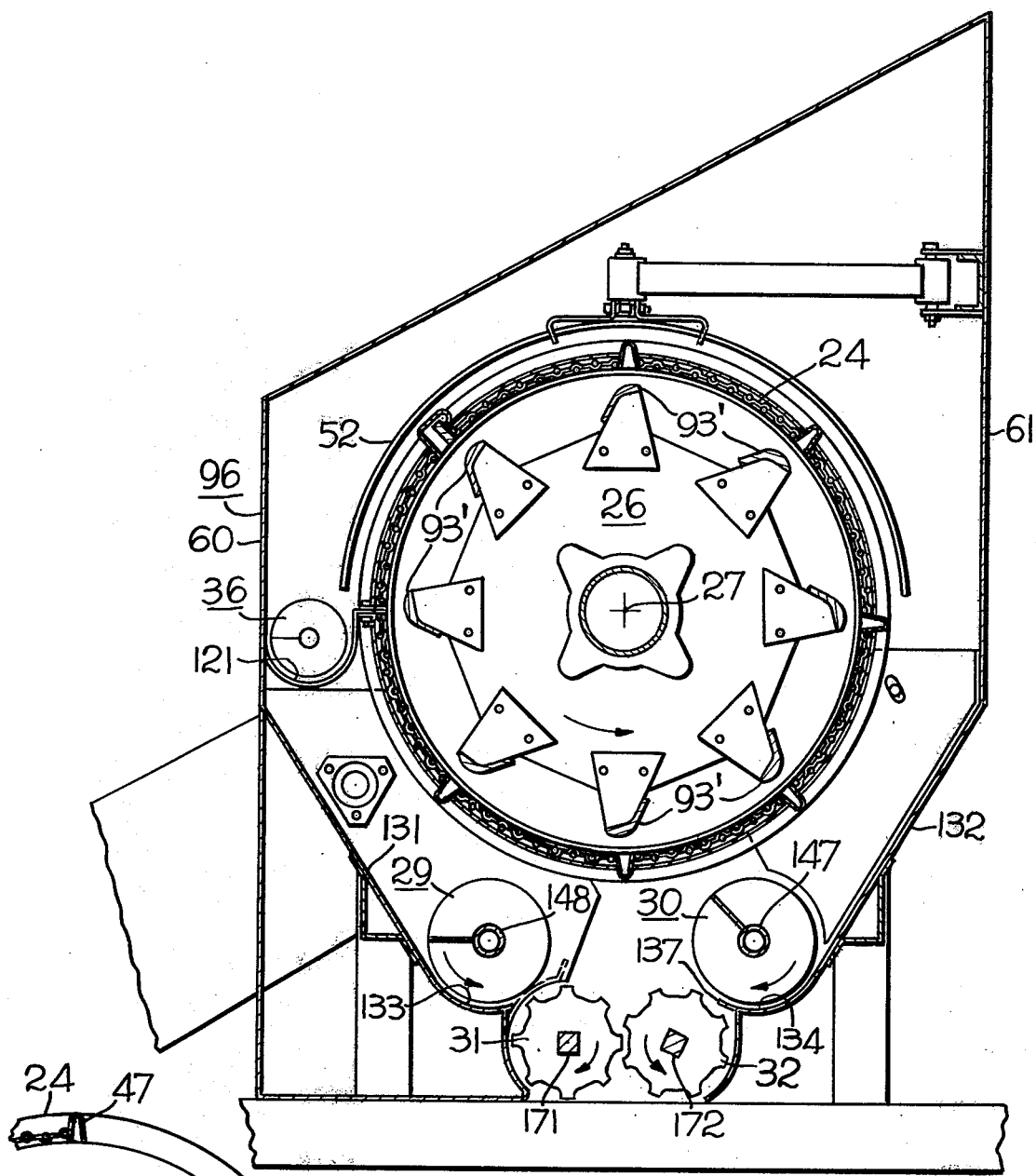
FIG. 3 is a section view taken along the line III—III in FIG. 2.

As illustrated in the drawings, the accelerator rolls 31, 32 are positioned below the feeder slot 106 and as best seen in FIG. 3 the distribution augers 29, 30 are equally spaced from, but on opposite sides of, a vertical plane 161 through the axis 27 of the threshing cylinder 26. The vertical plane 161 passes through the transverse feeder slot 106, which is generally coextensive with the accelerator rolls 31, 32 and passes between the axes 171, 172 of the accelerator rolls, which axes are equally spaced from but on opposite sides of the vertical plane 161.

The overfeed and distribution augers of this invention convey threshed material passing through the periphery of the cylinder cage to the feeding slot in a manner contributing to transversely uniform feeding to the cleaning section of the combine. The distribution augers make it possible to use an axial flow cylinder 26 disposed in transverse relation to the feeder 23 and shoe assembly, which is axially over twice as long as the feeder 23 is wide and which is approximately 1.4 times as long (axially) as the shoe assembly is wide. The shoe assembly is approximately 1.6 times as wide as the feeder 23. The distribution augers of this invention not only contribute to maximizing the harvesting capability of the combine but also contribute to compact arrangement of the threshing and cleaning sections. In order to minimize the redistribution of threshed material passing through the periphery of the cage the right sides or ends of the feeder 23, the cage 24, the cylinder 26, the slot 106, the accelerator rolls 31, 32 and the shoe assembly 43 are substantially in longitudinal and vertical alignment. In other words, the feeder 23, cylinder 26, cage 24, accelerator rolls 31, 32, slot 106 and shoe assembly 43 have their right extremities at the right vertical side wall 91 of the combine. The vertical side wall 91 has a forward portion 181 which forms the right side wall for the feeder section 182 of which the slat feeder 23 is a part. The vertical side wall 91 also has a rearwardly extending portion 183 which forms the right side wall of the cleaning section 87.

The embodiments of the invention in which an exclusive property or privilege is claimed are defined as follows:

1. In a combine having a header at its front end and a feeder for conveying harvested crop material from the header upwardly and rearwardly, the combination comprising:

a frame structure having walls defining a housing for a cylinder cage and a threshing cylinder, including front, rear, right and left side walls, a generally cylindrical cage mounted on said frame structure within said housing and extending between said left and right side walls with a generally horizontal axis extending in transverse relation to said feeder including a radially opening inlet adjacent one axial end of said cage through which said feeder discharges harvested crop radially inwardly into said cage and an outlet at the other axial end of said cage through which crop material is discharged from said cage, said cage being of a substantially greater axial dimension than the transverse width of said feeder and having a plurality of radial openings in its periphery permitting passage of threshed material through substantially its entire periphery, a threshing cylinder within said cage extending between said right and left walls and mounted on said frame for rotation on said horizontal transverse axis, means causing harvested crop material to move axially within said cage from said inlet to said outlet during a harvesting operation, said front and rear side walls of said housing being spaced from said cage to permit threshed material passing through the periphery of the cage to fall to the bottom of said housing, a cleaning shoe assembly disposed generally below said cylinder cage, the width dimension of said shoe assembly being substantially less than the axial length dimension of said cage, a transversely extending, downward opening feeding slot in said housing below said cage and above said cleaning shoe assembly, said slot extending transversely substantially coextensive with the width of said cleaning shoe assembly and a conveying mechanism operatively disposed within and at the bottom of said housing operable to move threshed material deposited in the bottom of the portion of the housing extending laterally beyond said cleaning shoe assembly to said slot.

2. The combination of claim 1 wherein said conveying mechanism includes at least one auger disposed below said cage and generally parallel thereto.

3. The combination of claim 1 wherein said conveying mechanism includes a distribution auger at the bottom of said housing extending between said left and right side walls.

4. The combination of claim 1 and further comprising a front trough in said housing disposed above said inlet and an overfeed auger therein operable to convey threshed material falling into said front trough to one lateral side of said feeder where it falls downwardly to the bottom of said housing.

5. The combination of claim 1 wherein said conveying mechanism includes a pair of transversely extending and longitudinally spaced distribution augers, the rear one of which is coextensive with said cage and the rear one of which extends from the left end of said cage to a point adjacent the inboard side of said feeder.

6. In a combine having a header at its front end and a feeder conveying harvested crop material from the header upwardly and rearwardly, the combination comprising:

a frame structure including walls defining a housing for a cylinder cage and a threshing cylinder, including front, rear, right and left side walls, a generally cylindrical cylinder cage mounted on said frame structure within said housing and extending between said left and right side walls with a generally horizontal axis extending in transverse relation to said feeder including, a radially opening inlet in said cage adjacent one axial end thereof through which said feeder discharges harvested crop into said cage and an outlet through which material is discharged from said cage, said cage being of a substantially greater axial dimension than the transverse width of said feeder and having a plurality of radial openings permitting passage of threshed material through substantially its entire periphery, a threshing cylinder within said cage extending between said right and left walls and mounted on said frame for rotation on said horizontal axis, the axial dimensions of said cylinder and cage being substantially greater than said feeder, means causing harvested crop material to move axially within said cage from said inlet to said outlet during a harvesting operation, a cleaning shoe assembly disposed generally below said cylinder cage, the width dimension of said shoe assembly being substantially less than the axial length dimension of said cage, a transversely extending, downward opening slot in the bottom of said housing below said cage and above said cleaning shoe assembly, said slot extending transversely substantially coextensive with the width of said cleaning shoe assembly a trough in said housing disposed above said inlet, and an overfeed auger in said trough operable to convey threshed material deposited in said trough to one lateral side of said feeder where it will fall by gravity between said front wall and said cage toward said slot.

7. The combination of claim 6 wherein said front wall includes a downwardly and rearwardly sloping portion onto which threshed material is discharged by said overfeed auger.

8. The combination of claim 7 and further comprising a transverse trough at the lower end of said sloping portion of said front wall and an auger in said transverse trough including a paddle operable to discharge threshed material from said transverse trough into said slot.

9. The combination of claim 8 wherein said auger in said transverse trough extends from the side wall remote from said inlet to a point adjacent said one lateral side of said feeder.

10. The combination of claim 6 wherein the right side of said feeder, said right side wall and the right side of said shoe assembly are in substantial fore and aft alignment.

* * * * *